(12) United States Patent
Stuart et al.

(10) Patent No.: US 10,380,811 B1
(45) Date of Patent: Aug. 13, 2019

(54) IMPLEMENT EQUIPMENT NOTIFICATION SYSTEM AND METHOD

(71) Applicant: CNH Industrial Canada, Ltd, Saskatoon (CA)

(72) Inventors: Graham Douglas Stuart, Warman (CA); Dennis William Chahley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/052,332

(22) Filed: Aug. 1, 2018

(51) Int. Cl.
| G08B 21/00 | (2006.01) |
| G07C 5/08 | (2006.01) |
| A01C 7/00 | (2006.01) |

(52) U.S. Cl.
CPC .............. G07C 5/0816 (2013.01); A01C 7/00 (2013.01)

(58) Field of Classification Search
CPC .......... G07C 5/0816; A01C 7/00; G08B 21/00
See application file for complete search history.

(56) References Cited

U.S. PATENT DOCUMENTS

| 6,148,863 | A | 11/2000 | Memory et al. |
| 6,285,938 | B1 | 9/2001 | Lang et al. |
| 6,581,530 | B1 | 6/2003 | Hall et al. |
| 6,854,405 | B2 | 2/2005 | Memory |
| 6,952,996 | B2 | 10/2005 | Sisk et al. |
| 7,267,519 | B2 | 9/2007 | Cresswell et al. |
| 7,472,663 | B1 | 1/2009 | Horn |
| 7,500,814 | B2 | 3/2009 | Meyer |
| 7,969,319 | B2 | 6/2011 | Kowalchuk |
| 8,683,930 | B2 | 4/2014 | Cresswell et al. |
| 9,232,690 | B2 | 1/2016 | Kowalchuk |
| 9,880,535 | B2 | 1/2018 | Henry |
| 2013/0085598 | A1* | 4/2013 | Kowalchuk ............ A01C 7/081 700/231 |
| 2016/0101739 | A1* | 4/2016 | Edelen ................... B60R 3/02 280/164.1 |

FOREIGN PATENT DOCUMENTS

CA   2488831   6/2006

* cited by examiner

*Primary Examiner* — Phung Nguyen
(74) *Attorney, Agent, or Firm* — Rebecca L. Henkel; Rickard K. DeMille (57) ABSTRACT

An equipment notification system for a component of an agricultural vehicle, including a processor configured to receive a first signal indicative of an operational parameter of the agricultural vehicle, determine an absence of the operational parameter based at least in part on the first signal, compare a period of time of the absence of the operational parameter to a threshold period of time associated with the operational parameter, and output, in response to determining that the period of time of the absence of the operational parameter exceeds the threshold period of time, a second signal indicative of an instruction to provide a notification regarding a position of the component of the agricultural vehicle via a user interface.

20 Claims, 6 Drawing Sheets

IMPLEMENT EQUIPMENT NOTIFICATION SYSTEM AND METHOD

BACKGROUND

The disclosure relates generally to an equipment notification system for an agricultural implement.

Generally, an air cart is used to meter and deliver agricultural product (e.g., seeds) to a seeding implement. The air cart may include a storage tank (e.g., a pressurized tank), an air source (e.g., a blower), and a metering system. The product may be gravity fed from the storage tank to the metering system, which distributes a target volume of product into an air flow generated by the air source. The air flow carries the product to the row units via conduits extending between the air cart and the seeding implement. The metering system may include meter rollers that regulate the flow of product based on meter roller geometry and rotation rate.

During the distribution process, circumstances may arise in which access to the air cart for the purposes of inspection, maintenance, or refilling may be needed. In such cases, an access ladder of the air cart may be utilized. The ladder may be moved into an access position to enable the inspection, maintenance, or refilling and back to a stowed position when the inspection, maintenance, or refilling is complete. However, it is now recognized that the ladder may be susceptible to damage if the ladder is not appropriately placed back into the stowed position prior to commencing or resuming further operation of the air cart.

BRIEF DESCRIPTION

In one embodiment, an equipment notification system for a component of an agricultural vehicle, including a processor configured to receive a first signal indicative of an operational parameter of the agricultural vehicle, determine an absence of the operational parameter based at least in part on the first signal, compare a period of time of the absence of the operational parameter to a threshold period of time associated with the operational parameter, and output, in response to determining that the period of time of the absence of the operational parameter exceeds the threshold period of time, a second signal indicative of an instruction to provide a notification regarding a position of the component of the agricultural vehicle via a user interface.

In another embodiment, a method of providing an equipment notification for a component of an air cart includes receiving, via a processor, a signal indicative of a current ground speed of the air cart from a ground speed sensor disposed on the air cart, determining, via the processor, an absence of ground speed of the air cart based at least in part on the signal received from the ground speed sensor, determining, via the processor, a period of time of the absence of ground speed of the air cart, and providing, via a user interface, a notification regarding a position of the component of the air cart in response to determining the period of time of the absence of ground speed of the air cart, wherein the user interface is disposed remote from the air cart.

In a further embodiment, a tangible, non-transitory, and computer-readable medium having instructions stored thereon that, when executed by a processor, are configured to cause the processor to receive a first signal indicative of a current ground speed of an air cart of an agricultural system from a ground speed sensor disposed on the air cart, determine an absence of ground speed of the air cart based at least in part on the first signal from the ground speed sensor, determine a period of time of the absence of ground speed based at least in part on the first signal from the ground speed sensor, compare the period of time of the absence of ground speed to a threshold period of time, and output, in response to determining that the period of time of the absence of ground speed exceeds the threshold period of time, a second signal indicative of an instruction to provide a notification regarding the position of a ladder of the air cart via a user interface disposed within a cabin of a work vehicle of the agricultural system, wherein the work vehicle is configured to tow the air cart.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
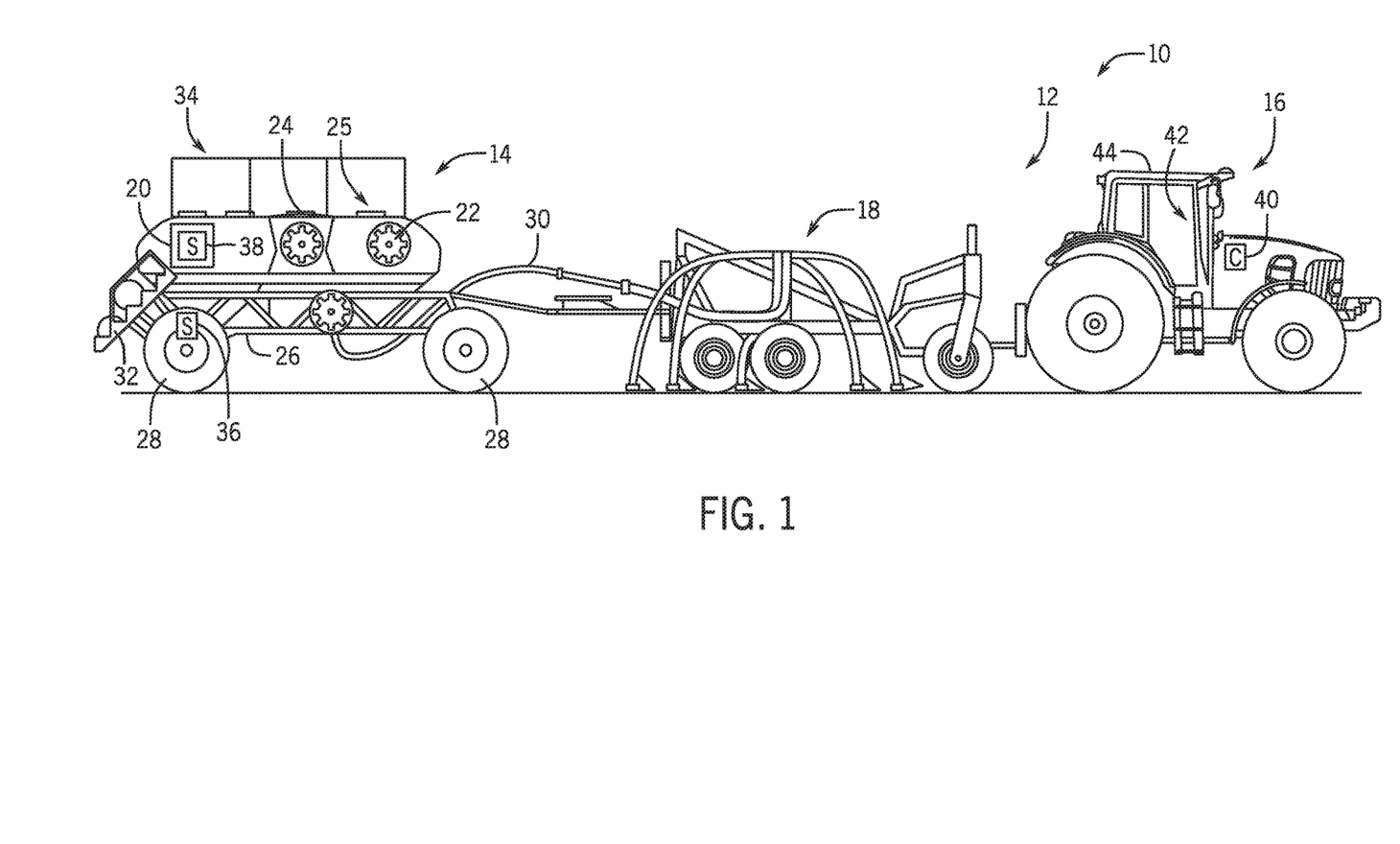
FIG. 1 is a side view of an embodiment of an agricultural system having an implement equipment notification system, in accordance with an embodiment of the present disclosure.

Turning now to the drawings, FIG. 1 is a schematic view of an embodiment of an agricultural system 10 having an implement equipment notification system 12. The agricultural system 10 may include various vehicles, including an air cart 14, a work vehicle 16 (e.g., tractor), and an implement 18. The work vehicle 16 may be coupled to the implement 18 and used to tow the air cart 14 and the implement 18. The air cart 14 may be coupled to the implement 18 and may be employed to distribute agricultural product (e.g., seeds, fertilizer) to the implement 18 using a fan 20, or other blower, and a metering system 22, which may include a series of meter rollers. The air cart 14 may be coupled to the implement 18, which is coupled to the work vehicle 16 in a tow-behind configuration of the agricultural system 10, as show in the illustrated embodiment. In some embodiments, the air cart 14 may be coupled to the work vehicle 16 and the implement may be coupled to the air cart 14 in a tow-between configuration of the agricultural system 10.

The air cart 14 may be used in conjunction with the implement 18 to distribute the product throughout a field. In the illustrated embodiment, the air cart 14 includes a storage tank 24, a frame 26, wheels 28, the metering system 20, and the fan 22 (e.g., air source). The storage tank 24 may contain a product 25 to be distributed throughout the field. The frame 26 includes a towing hitch configured to couple to the implement 18 or the work vehicle 16. The metering system 22 may include one or more meter rollers that regulate the flow of the product 25 from the storage tank 24 into an air flow provided by the fan 20. The air flow then carries the product 25 to the implement 18 via one or more pneumatic conduits 30. In this manner, the row units of the implement 18 may receive the product 25 for distribution into the field and/or deposition within the soil.

Additionally, the air cart 14 may include a ladder 32 (e.g., one or more bars, steps, stairs) that may be utilized for providing access to an access platform 34. The access platform 34 may be utilized for refilling of the storage tank 24 of the air cart 14, for inspection of the air cart 14, for maintenance of the air cart 14, or for any other action in which access to the air cart 14 above ground level is desired. For example, an operator may climb or ascend the ladder 32 to reach the access platform 34, and while standing on the access platform 34, the operator may carry out certain tasks or visualize certain components. The ladder 32 may be positioned at the rear of the air cart 14 as shown in the illustrated embodiment, at the front of the air cart 14, or at any other position about the air cart 14 suitable for providing access to the access platform 34. Additionally, the ladder 32 may be rigid, non-foldable, and/or foldable. The ladder 32 may move between an access position (e.g., lowered, unfolded) in which the ladder 32 is able to be used by the operator to access the access platform 34 and a stowed position (e.g., raised, folded, stored) in which the ladder 32 is away from the ground and not able to be used by the operator to access the access platform 34.

The implement equipment notification system 12 may be used to provide a notification related to the ladder 32, such as a notification that prompts confirmation by an operator that the ladder 32 has been stowed and is not in an access position upon commencement of operation of the air cart 14. Such a notification maybe be displayed to the operator based at least in part on particular sensor input signals from sensors of the implement equipment notification system 12. In some embodiments, the implement equipment notification system 12 may utilize existing sensors of the air cart 14. The implement equipment notification system 12 may include a ground speed sensor 36 that may measure a current ground speed of the air cart 14. The ground speed sensor 36 may be disposed at any location about the air cart 14 suitable for measuring the ground speed of the air cart 14. Additionally, the implement equipment notification system 12 may include a fan speed sensor 38 that may measure a current speed of the fan 20 of the air cart 14. The fan speed sensor 38 may be disposed at any position about the air cart 14 suitable for measuring the current speed of the fan 20.

The implement equipment notification system 12 may further include a notification controller 40. The notification controller 40 may be disposed remote from the air cart 14, such as in the work vehicle 16, as shown in the illustrated embodiment. The location of the notification controller 40 on the work vehicle 16 may allow for display of a notification message to the operator of the agricultural system 10 via a user interface 42 of the implement equipment notification system 12 disposed within a cabin 44 of the work vehicle 16. In some embodiments, for example in agricultural systems including auto-steering or autonomous components, the notification controller 40 and/or the user interface 42 may be disposed at locations remote from the work vehicle 16 or the agricultural system 10 for display of the notification to the operator.

The ground speed sensor 36 and/or the fan speed sensor 38 may each be communicatively coupled to and configured to send signals to the notification controller 40 and/or a controller of the air cart 14. The ground speed sensor 36 and the fan speed sensor 38 may communicate wirelessly with the notification controller 40 of the implement equipment notification system 12; however, wired control circuitry may be included. The ground speed sensor 36 and the fan speed sensor 38 may send signals to the notification controller 40 indicative of the ground speed of the air cart 14 and/or the fan speed of the fan 22 of the air cart 14, respectively. The notification controller 40 may then determine whether to cause display of the notification to the operator via the user interface 42 based at least in part on the signals received from the ground speed sensor 36, the fan speed sensor 38, or a combination thereof. Such determination and display of the notification to the operator of the air cart 14 and/or the agricultural system 10 may decrease unintended contact between the ladder 32 and the air cart 14, the work vehicle 16, the implement 18, or other elements within the field, and thus may improve working lifetime of the ladder 32 and other components of the agricultural system 10.

Additionally or alternatively, in some embodiments, the implement equipment notification system 12 may include other sensors, such as a door sensor and/or a seat sensor disposed within or on the cabin 44 of the work vehicle, or at any other location suitable for determining when the operator may have exited the cabin 44. The door sensor and/or the seat sensor may each be communicatively coupled to and configured to send signals to the notification controller 40. The door sensor and/or the seat sensor may communicate wirelessly with the notification controller 40; however, wired control circuitry may be included. The door sensor and/or the seat sensor may send signals to the notification controller 40 indicative of opening of the door of the cabin 44 and/or movement of the operator from the seat within the cabin 44, respectively. The notification controller 40 may then determine whether to cause display of the notification to the operator via the user interface 42 based at least in part on the signals received from the door sensor, the seat sensor, the ground speed sensor 36, the fan speed sensor 38, or a combination thereof.

It should be understood that the present embodiments are discussed within the context of a ladder of an air cart, however the implement equipment notification system 12 is also applicable to any type of equipment, such as a door or ladder, which may be moveably attached to any type of implement, such as a planter or a drill.

Figure 2:
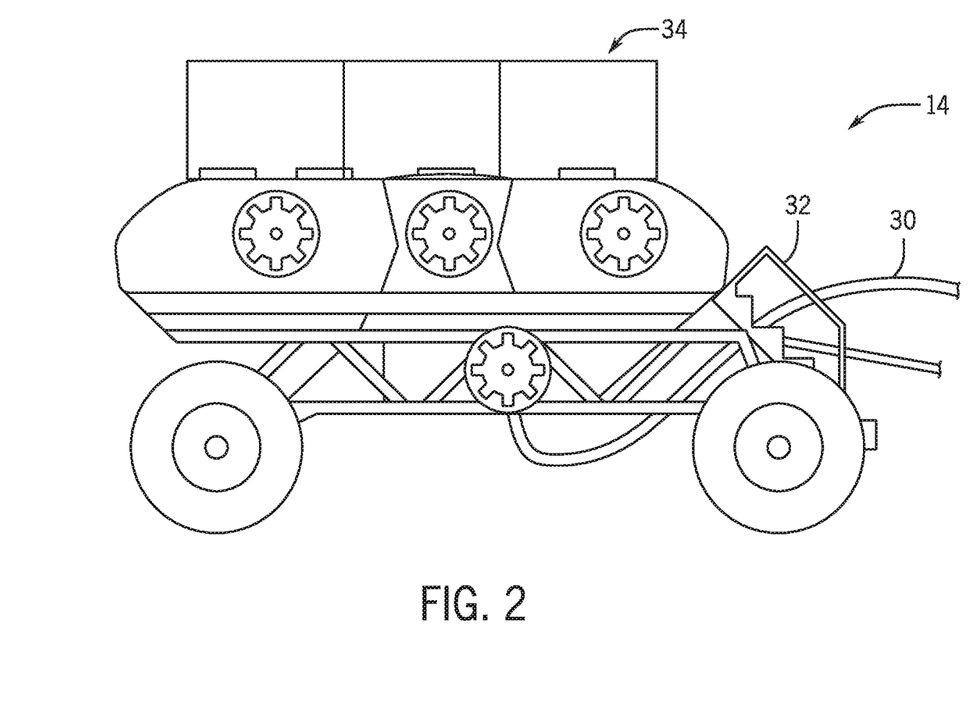
FIG. 2 is side view of an embodiment of an air cart of the agricultural system of FIG. 1 showing a ladder positioned at a front of the air cart, in accordance with an embodiment of the present disclosure.

FIG. 2 is side view of the air cart 14 showing an alternative position of the ladder 32. In FIG. 1, the ladder 32 is positioned at the rear of the air cart 14, such that the ladder 32 is disposed on the opposite side of the air cart 14 as the connection between the air cart 14 and the implement 18 or work vehicle 16. In some embodiments, as shown in FIG. 2, the ladder 32 may be positioned on the front of the air cart 14, such that the ladder 32 is disposed on the side of the air cart 14 closest to the connection between the air cart 14 and the implement 18 or work vehicle 16. However, the ladder 32 may be disposed at any location about the air cart 14 suitable to allow access to the access platform 34 for the purposes of refilling, inspection, or maintenance.

Additionally, the ladder 32 may be any type of ladder suitable for allowing access to the access platform 34. For example, the ladder 32 may be foldable, such that the ladder may be unfolded to allow access to the access platform 34 and folded into the stowed position when not in use. However, in some embodiments, the ladder 32 may be rigid and non-foldable, such that the ladder may be pushed or pulled into the access position to provide access to the access platform 34 and pushed or pulled into the stowed position when not in use. As the notification controller 40 of the implement equipment notification system 12 may determine whether to display the notification to the operator via the user interface 42 based at least in part on the detected ground speed of the air cart 14 and/or fan speed of the fan 20 of the air cart 14, the implement equipment notification system 12 may work with any type of ladder 32 positioned at any location about the air cart 14.

Figure 3:
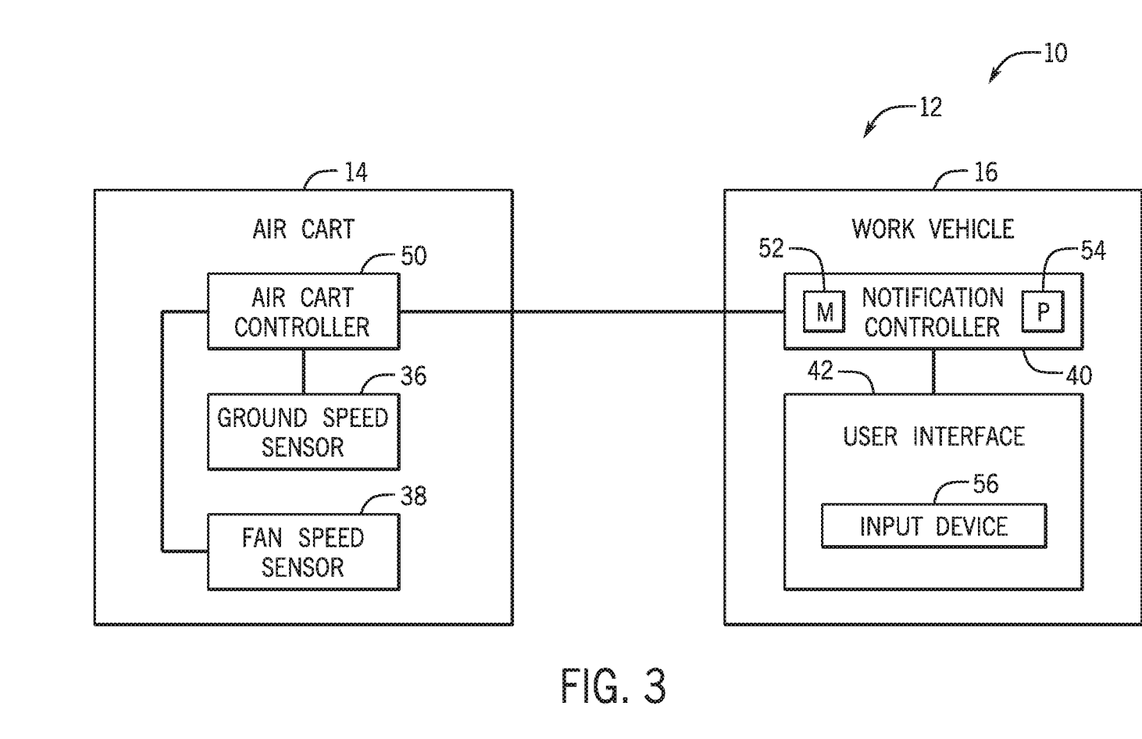
FIG. 3 is a schematic diagram of an embodiment of the implement equipment notification system of FIG. 1, in accordance with an embodiment of the present disclosure.

FIG. 3 is a schematic diagram of an embodiment of the implement equipment notification system 12 for prompting the operator of the air cart 14 and/or the agricultural system 10 to confirm that the ladder 32 (shown in FIGS. 1 and 2) is in the stowed position based on particular operational parameters of the air cart 14. As previously discussed, the implement equipment notification system 12 may include the notification controller 40 and various sensors, including the ground speed sensor 36 and/or the fan speed sensor 38. The notification controller 40 may be communicatively coupled to the ground speed sensor 36 and/or the fan speed sensor 38 directly or indirectly via an air cart controller 50. The notification controller 40 may include a memory 52 and a processor 54. In some embodiments, the memory 52 may include one or more tangible, non-transitory, computer-readable media that store instructions executable by the processor 54 and/or data to be processed by the processor 54. For example, the memory 52 may include access memory (RAM), read only memory (ROM), rewritable non-volatile memory such as flash memory, hard drives, optical discs, and/or the like. Additionally, the processor 54 may include one or more general purpose microprocessors, one or more application specific processors (ASICs), one or more field programmable logic arrays (FPGAs), or any combination thereof.

In operation, the notification controller 40 may receive signals indicative of operational parameters of the air cart 14 from one or more sensors, such as the ground speed sensor 36 and/or the fan speed sensor 38. The notification controller 40 may utilize the signals received from the sensors, such as the ground speed sensor 36, the fan speed sensor 38, or a combination thereof, to determine whether the notification regarding position of the ladder 32 should be displayed via the user interface 42. As noted above, the notification may prompt the operator of the air cart 14 and/or the agricultural system 10 to confirm that the ladder 32 is in the stowed position. For example, based on the signals received from the ground speed sensor 36 and/or the fan speed sensor 38, the notification controller 40 may determine that the ladder 32 may have been used and then prompt the operator to confirm that the ladder 32 has been raised or folded to the stowed position before operation of the air cart 14 is commenced or resumed.

The notification controller 40 may receive one or more signals from the ground speed sensor 36 indicative of the current speed of the air cart 14. In some embodiments, based at least in part on the input signals from the ground speed sensor 36, the notification controller 40 may determine whether there is an absence of ground speed (e.g., the air cart 14 is stationary). In such embodiments, if the notification controller 40 determines that there has been an absence of ground speed of the air cart 14 for a particular amount of time, the notification controller 40 may determine that an event has occurred that may have resulted in the ladder 32 being moved to the access position to provide access to the access platform 34. As such, the notification controller 40 may compare the amount of time during which an absence of ground speed has been detected to a threshold period of time. The threshold period of time for the absence of fan speed may be less than an amount of time that would allow use of the ladder 32, and greater than an amount of time that may be involved for a simple stop in which the ladder 32 is not utilized. For example, the threshold period of time may be thirty seconds, one minute, two minutes, etc. If the notification controller 40 determines that there has been an absence of ground speed of the air cart 14 for a period of time that exceeds the threshold period of time, the notification controller 40 may then output a signal to the user interface 42 indicative of an instruction to display the notification to the operator, which is discussed in greater detail with reference to FIG. 5. Determination of whether to display the notification based at least in part on an absence of detected ground speed for the threshold period of time may allow the implement equipment notification system 12 to prompt the operator of the air cart 14 and/or the agricultural system 10 to confirm the position of the ladder 32 before the air cart 14 is subsequently moved after being stationary.

Additionally or alternatively, the notification controller 40 may cause the notification to be displayed via the user interface 42 each time that the work vehicle 16 of the agricultural system 12 is rekeyed or restarted. Rekeying or restarting of the work vehicle 16 may indicate that there has been time between distribution operations or that the agricultural system 10, including the air cart 14, has been stopped for refilling, inspection, or maintenance that may have resulted in the ladder 32 of the air cart 14 being moved to the access position.

Additionally or alternatively, the notification controller 40 may receive one or more signals from the fan sensor 38 indicative of the current speed at which the fan 20 of the air cart 14 is moving or blowing. The presence of fan speed may indicate that the air cart 14 is currently in use and is providing the product 25 to the implement 18 for distribution. In some embodiments, the notification controller 40 may determine whether there is an absence of fan speed of the fan 20. In such embodiments, if the notification controller determines that there has been an absence of fan speed (e.g., the fan 20 is stationary) for a particular amount of time, the notification controller 40 may determine that an event has occurred that may have resulted in the ladder 32 being moved to the access position to provide access to the access platform 34. As such, the notification controller 40 may compare the amount of time during which an absence of fan speed has been detected to a threshold period of time. As with the threshold period of time for the absence of ground speed, the threshold period of time for the absence of fan speed may be less than an amount of time that would allow use of the ladder 32, and greater than an amount of time that may be involved for a simple stop in which the ladder 32 is not utilized. For example, the threshold period of time for the absence of fan speed may be thirty seconds, one minute, two minutes, etc. If the notification controller 40 determines that there has been an absence of fan speed of the fan 20 of the air cart 14 for a period of time that exceeds the threshold period of time, the notification controller 40 may then output a signal to the user interface 42 indicative of an instruction to display the notification to the operator. Determination of whether to display the notification based at least in part on an absence of detected fan speed for the threshold period of time may allow the implement equipment notification system 12 to prompt the operator of the air cart 14 and/or the agricultural system 12 to confirm the position of the ladder 32 before the distribution operation of the air cart 14 has commenced or resumed.

Additionally or alternatively, based at least in part on the input signals from the ground speed sensor 36 and/or the fan speed sensor 38, the notification controller 40 may determine whether there is a presence of ground speed and/or fan speed, thus indicating that the air cart 14 is moving and/or currently distributing the product 25 to the implement 18. If the notification controller 40 determines that the air cart 14 is currently moving and/or currently distributing the product 25, the notification controller may output a signal to the user interface 42 indicative of an instruction to display the notification to prompt the operator to confirm that the ladder 32 is in the stowed position.

The user interface 42 of the implement equipment notification system 12 may include an electronic display to facilitate providing the notification and a visual representation of other information to the operator, for example, via a graphical user interface (GUI), an application interface, text, a still image, and/or video content. The user interface 42 may include an input device 56, which may include a button, a keyboard, a mouse, a trackpad, and/or any other input device suitable to allow operator interaction with the implement equipment notification system 12. For example, the input device 56 may allow the operator to confirm or acknowledge the notification to the implement equipment notification system 12 that the ladder 32 is in the stowed position when the notification is displayed.

Figure 4:
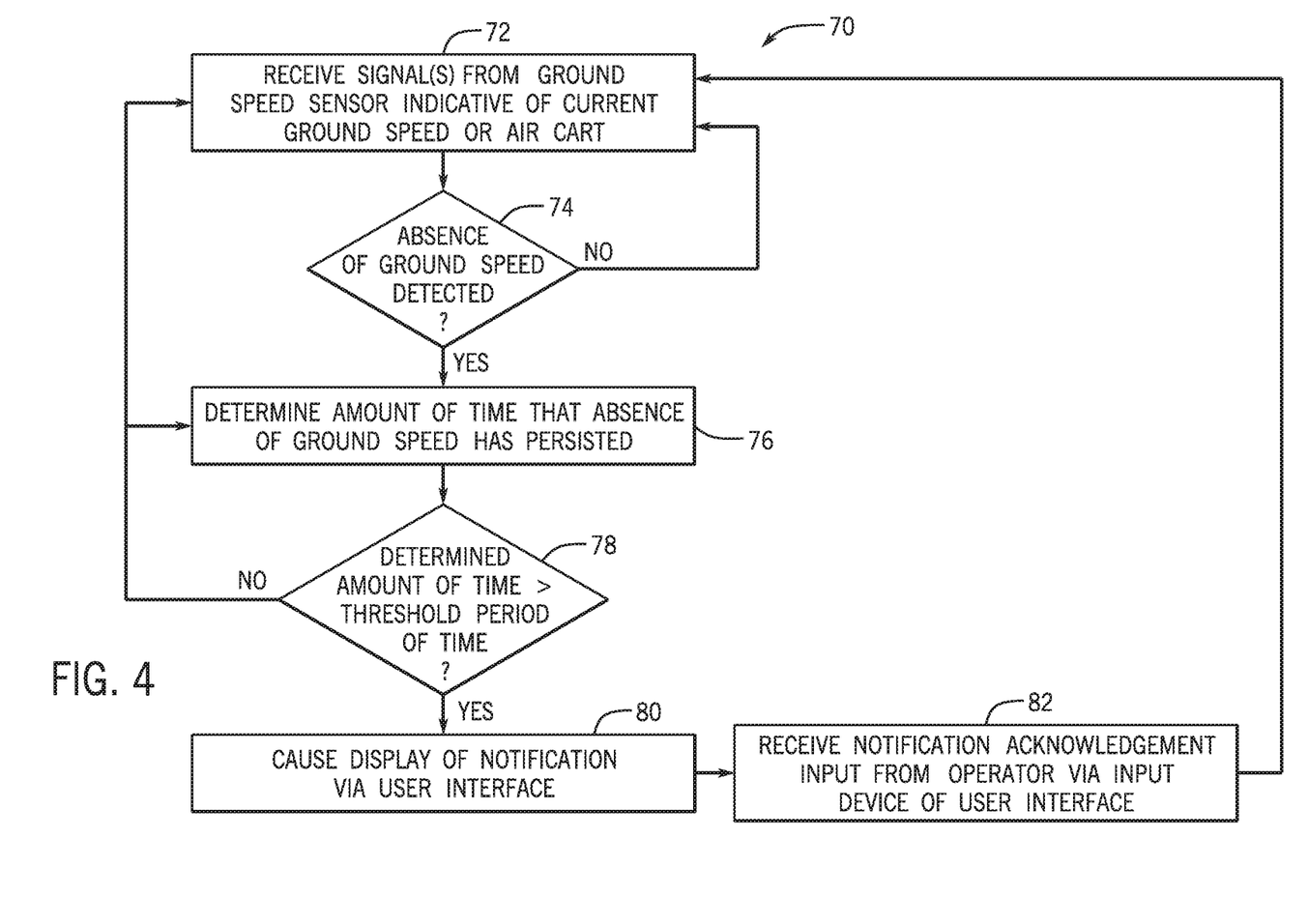
FIG. 4 is a flow diagram of an embodiment of a method for providing a notification regarding implement equipment position using the implement equipment notification system of FIG. 1, in accordance with an embodiment of the present disclosure.

FIG. 4 is a flow diagram of an embodiment of a method 70 for determining and providing, via the implement equipment notification system 12, the notification regarding a position of the ladder 32, or other implement equipment, based at least in part on signals received from the ground speed sensor 36. At step 72, the notification controller 40 may receive one or more signals from the ground speed sensor 36 indicative of the current ground speed of the air cart 14. Next, at step 74, the notification controller 74 may determine, based at least in part on the input signals received from the ground speed sensor 36, whether there is an absence of ground speed, thus indicating that the air cart 14 is stationary. If the notification controller 40 determines that an absence of ground speed is not detected, that is that the air cart 14 is moving, the method 70 may return to the step 72.

If the notification controller 40 determines that an absence of ground speed is detected based at least in part on the input signals received from the ground speed sensor 36, at step 76, the notification controller 40 may determine an amount of time during which the absence of ground speed of the air cart 14 has persisted. Next, at step 78, the notification controller 40 may compare the amount of time during which the absence of ground speed of the air cart 14 has persisted, determined at step 76, to the threshold period of time. If the determined amount of time during which the absence of ground speed of the air cart 14 has persisted is less than the threshold period of time, the method 70 may return to step 72 and/or step 76 to continue detecting and determining the amount of time during which the absence of ground speed of the air cart has persisted.

If the notification controller 40 determines that the determined amount of time during which the absence of ground speed of the air cart 14 has persisted is greater than the threshold period of time, the notification controller 40 may output a signal to the user interface 42 indicative of an instruction to display the notification to the operator at step 80. At step 82, the notification controller 40 may receive an acknowledgement input of the notification from the operator via the input device 56. For example, the operator may select a virtual button on a display of the user interface 42 or select a particular button on a keypad acknowledging the notification and/or confirming that the ladder 32 is in the stowed position. Thus, the implement equipment notification system 12 may provide notice to the operator to confirm the position of the ladder 32 prior to commencement of movement and/or operation of the air cart 14, such that the ladder 32 may not contact other components of the agricultural system 10 during the distribution process.

As previously discussed, additionally or alternatively, the implement equipment notification system 12 may utilize signals received from the fan speed sensor 38 indicative of the current speed of the fan 20 of the air cart 14 to determine whether to display the notification. In such embodiments, the method 70 may be used to determine the absence of fan speed that exceeds the threshold period of time associated with the fan speed and to display the notification based at least in part on such a determination. Further, additionally or alternatively, the implement equipment notification system 12 may determine the presence of ground speed and/or fan speed of the air cart 14, or any rekeying or restarting of the work vehicle 16, and may cause the notification to be displayed based at least in part on such determinations. That is, the implement equipment notification system 12 may determine instances in which the ladder 32 of the air cart 14 may have been moved to the access position to access the access platform 34 and may cause the notification to be displayed to the operator to prompt confirmation by the operator that the ladder 32 has been raised or folded to the stowed position prior to commencing or resuming operation of the air cart 14.

Figure 5:
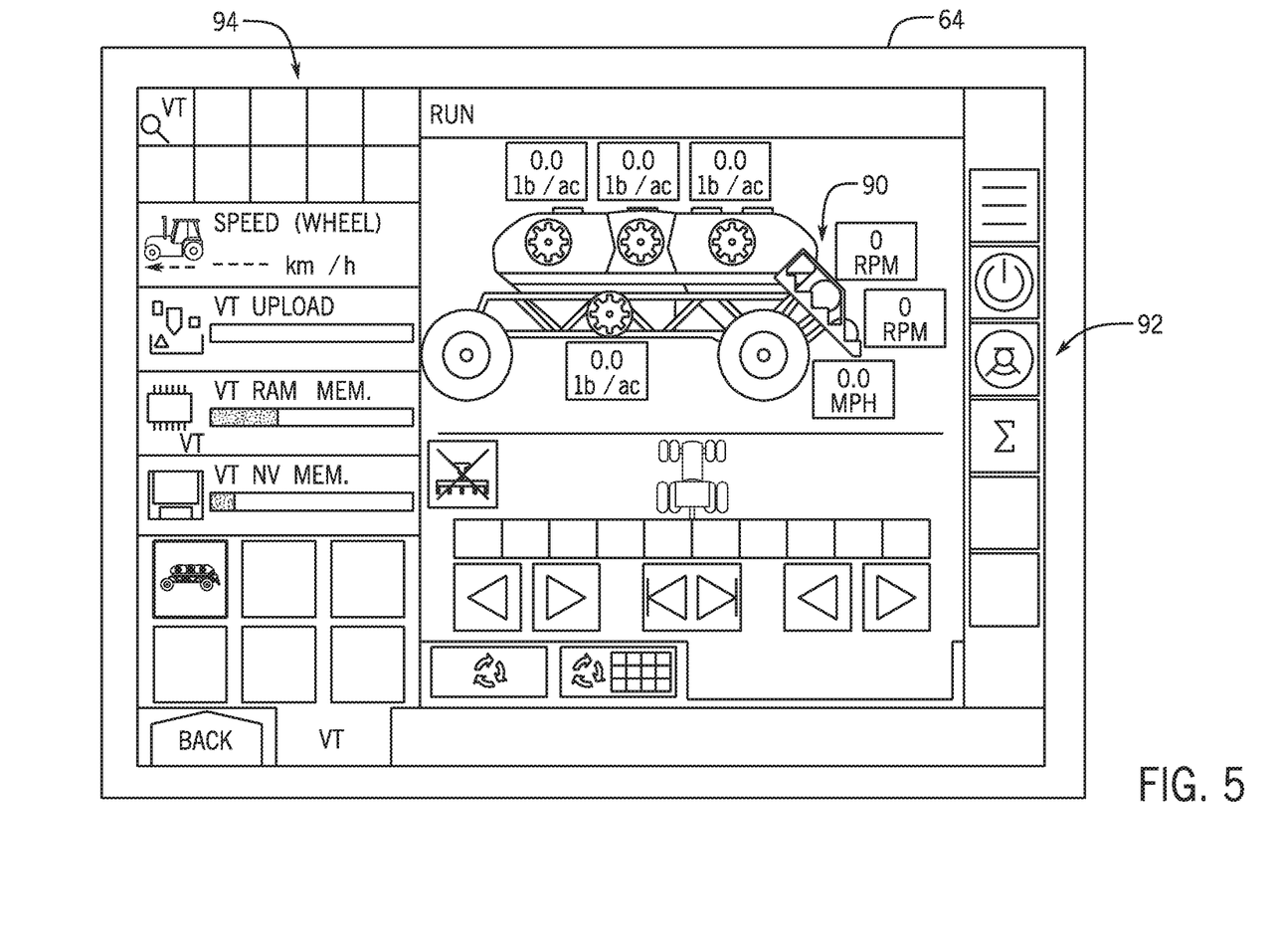
FIG. 5 a front view of an embodiment of a user interface that may be employed within the implement equipment notification system of FIG. 1 showing a notification regarding implement equipment position, in accordance with an embodiment of the present disclosure.

To illustrate the display of the notification, FIG. 5 is an embodiment of the user interface 42 showing a notification 90 regarding the implement equipment position. When the notification controller 40 determines that the signals received from the ground speed sensor 36, the fan speed sensor 38, or a combination thereof may indicate that the ladder 32 may have been moved into the access position, the notification controller 40 may cause the user interface 42 to display the notification 90 on a display 92 of the user interface 42. In the illustrated embodiment, the notification 90 is provided as a visual representation of the ladder 32 of the air cart 14. The notification 90 may include flashing, color change, or other change in the visual representation of the ladder 32 on the display 92 suitable to draw the attention of the operator. Such embodiments of the notification 90 may not cover or block visualization of other operational parameter information 94 regarding the agricultural system 10 that may be displayed using the display 92 of the user interface 42. In some embodiments, the notification 90 may include a pop-up window or message that may prompt the operator to confirm the position of the ladder 32. Additionally or alternatively, in some embodiments, the notification 90 may include or be accompanied by an audible alarm to increase awareness of the notification by the operator. As previously discussed, in some embodiments, the notification 90 may remain visible on the display 92 and/or audible until an acknowledgement input is received from the operator via the input device 56 of the user interface 42. For example, the operator may activate a button on or associated with the notification 90 via a mouse, track pad, keypad, or other similar input device 56 to acknowledge the notification 90.

Additionally or alternatively, the notification 90 may remain visible on the display 92 and/or audible for a period of time.

Figure 6:
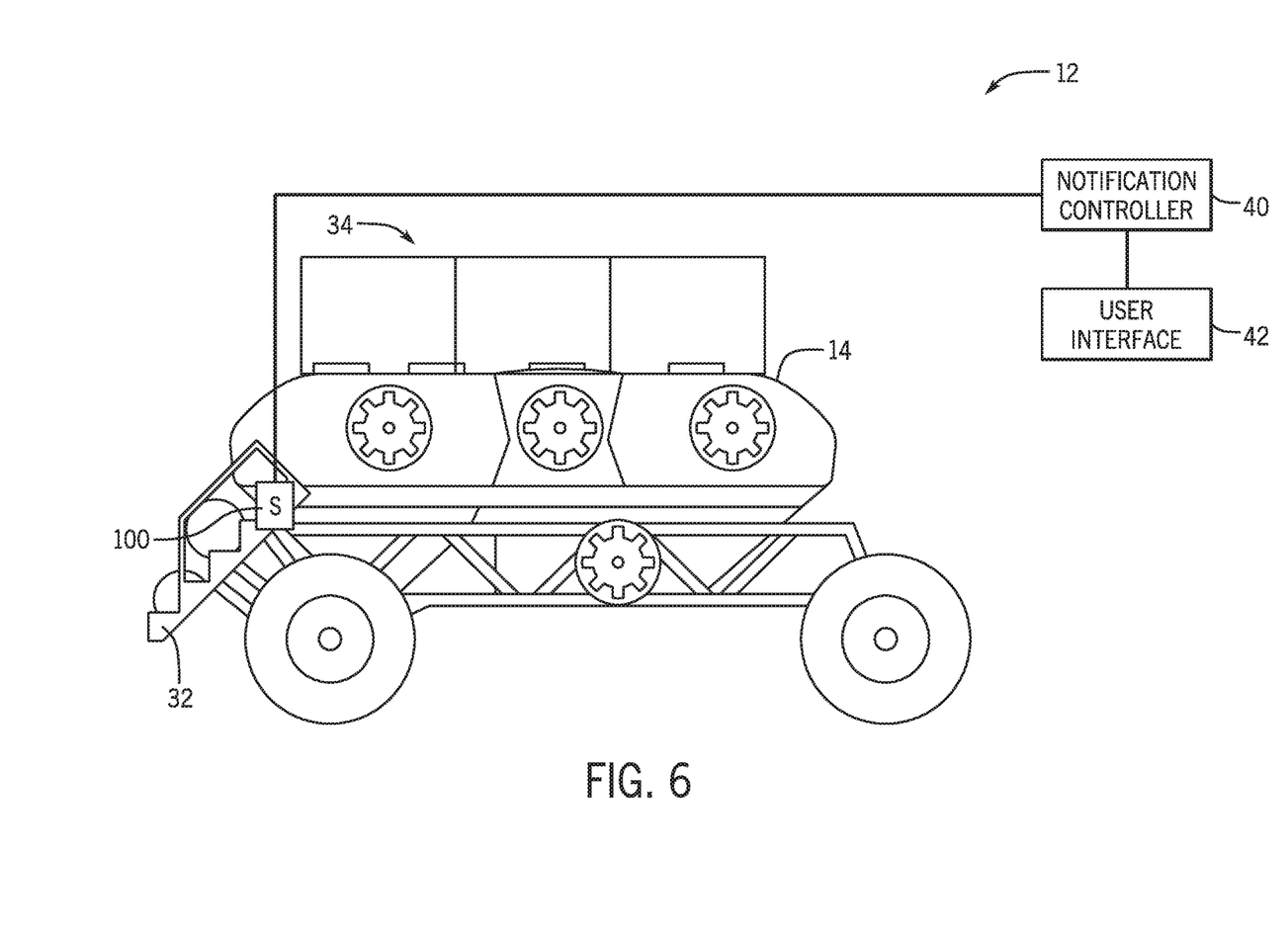
FIG. 6 is a side view of an air cart of the agricultural system having the implement equipment notification system with a proximity sensor, in accordance with an embodiment of the present disclosure.

FIG. 6 illustrates an additional embodiment of the implement equipment notification system 12 that may include a proximity sensor 100 (e.g., Hall Effect sensor, pressure switch, optical sensor). The proximity sensor 100 may be disposed on the air cart 14 adjacent to the ladder 32 and may be configured to detect the position of the ladder 32. The proximity sensor 100 may be communicatively coupled to the notification controller 40 and configured to send signals to the notification controller 40 indicative of the position of the ladder 32 (e.g., access position or stowed position).

The proximity sensor 100 may be positioned such that it detects the ladder 32 when in the stowed position or in the access position. As such, based on the signals received from the proximity sensor 100 indicating the presence or absence of the ladder 32 adjacent to the proximity sensor 100, the notification controller 40 may determine whether the ladder 32 is in the stowed position or in the access position. For example, if the proximity sensor 100 is disposed such that it will detect the presence of the ladder 32 when the ladder 32 is in the stowed position, when the signals from the proximity sensor 100 are indicative of the presence of the ladder 32, the notification controller 40 may determine that the ladder 32 is in the stowed position. When the signals from the proximity sensor 100 are indicative of the absence of the ladder 32, the notification controller 40 may determine that the ladder 32 is in the access position. Similarly, if the proximity sensor 100 is disposed such that it will detect the presence of the ladder 32 when the ladder 32 is in the access position, when the signals from the proximity sensor 100 are indicative of the presence of the ladder 32, the notification controller 40 may determine that the ladder 32 is in the access position. When the signals from the proximity sensor 100 are indicative of the absence of the ladder 32, the notification controller 40 may determine that the ladder 32 is in the stowed position.

In some embodiments, the notification controller 40 may cause the display 92 of the user interface 42 to provide the notification 90 and/or sound the audible alarm when it is determined that the ladder 32 is in the access position based at least in part on the signals received from the proximity sensor 100. In some embodiments, the proximity sensor 100 may be used in conjunction with the ground speed sensor 36, the fan speed sensor 38, or both. In such embodiments, the notification controller 40 may cause the notification 90 to be displayed to the operator via the user interface 42 when it is determined that ground speed of the air cart 14 is absent for the threshold period of time based at least in part on the signals received from the ground speed sensor 36 and/or the fan speed of the fan 20 of the air cart 14 is absent for the threshold period of time based at least in part on the signals received from the fan speed sensor 38 and the signals from the proximity sensor 100 indicate that the ladder 32 is in the access position. Additionally or alternatively, the notification controller 40 may cause the notification 90 to be displayed to the operator via the user interface 42 when it is determined that the air cart 14 is moving and/or the fan 20 of the air cart 14 is operational based at least in part on the signals received from the ground speed sensor 36 and the fan speed sensor 38, respectively, and the signals from the proximity sensor 100 indicate that the ladder is in the access position. Additionally or alternatively, the notification controller 40 may cause the notification 90 to be displayed to the operator via the user interface 42 when the work vehicle 16 is rekeyed or restarted and the signals from the proximity sensor 100 indicate that the ladder is in the access position.

As such, the implement equipment notification system 12 may determine instances in which the ladder 32 of the air cart 14 may have been moved to the access position and may cause the notification to be displayed to the operator to prompt confirmation by the operator that the ladder 32 has been raised or folded to the upright stowed position prior to commencing or resuming operation of the air cart 14. The implement equipment notification system 12 may determine such instances based at least in part on the signals received from the ground speed sensor 36, the fan speed sensor 38, the proximity sensor 100, or any combination thereof.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An equipment notification system for a component of an agricultural vehicle, comprising a processor configured to:
   receive a first signal indicative of an operational parameter of the agricultural vehicle;
   determine an absence of the operational parameter based at least in part on the first signal;
   compare a period of time of the absence of the operational parameter to a threshold period of time associated with the operational parameter; and
   output, in response to determining that the period of time of the absence of the operational parameter exceeds the threshold period of time, a second signal indicative of an instruction to provide a notification regarding a position of the component of the agricultural vehicle via a user interface.

2. The equipment notification system of claim 1, comprising a ground speed sensor configured to output the first signal, wherein the operational parameter comprises a ground speed of the agricultural vehicle, and the first signal is indicative of a current ground speed of the agricultural vehicle.

3. The equipment notification system of claim 2, wherein the ground speed sensor is disposed on the agricultural vehicle.

4. The equipment notification system of claim 1, wherein the agricultural vehicle comprises an air cart.

5. The equipment notification system of claim 1, wherein the component of the agricultural vehicle comprises a ladder, and the notification comprises a prompt to an operator to confirm that the ladder is in a stowed position.

6. The equipment notification system of claim 1, comprising the user interface, wherein the user interface is disposed remote from the agricultural vehicle.

7. The equipment notification system of claim 1, comprising a fan speed sensor disposed on the agricultural vehicle, wherein the operational parameter comprises a fan speed of the fan of the agricultural vehicle, and wherein the first signal is indicative of a current fan speed of the fan of the agricultural vehicle.

8. The equipment notification system of claim 1, wherein the processor is configured to receive a third signal from the user interface indicative of an acknowledgement of the notification by an operator via an input device of the user interface.

9. The equipment notification system of claim 1, wherein the user interface is configured to display a visual representation of the agricultural vehicle comprising a visual representation of the component, and wherein the notification comprises flashing, color change, or a combination thereof of the visual representation of the component.

10. A method of providing an equipment notification for a component of an air cart, comprising:
receiving, via a processor, a signal indicative of a current ground speed of the air cart from a ground speed sensor disposed on the air cart;
determining, via the processor, an absence of ground speed of the air cart based at least in part on the signal received from the ground speed sensor;
determining, via the processor, a period of time of the absence of ground speed of the air cart; and
providing, via a user interface, a notification regarding a position of the component of the air cart in response to determining the period of time of the absence of ground speed of the air cart, wherein the user interface is disposed remote from the air cart.

11. The method of claim 10, comprising comparing, via the processor, the period of time of the absence of ground speed of the air cart to a threshold period of time, and wherein providing the notification comprises providing, via the user interface, the notification regarding the position of the component in response to determining that the period of time of the absence of ground speed of the air cart is greater than the threshold period of time.

12. The method of claim 11, wherein the threshold period of time comprises at least 30 seconds.

13. The method of claim 10, wherein providing the notification comprises providing, via a display of the user interface, a visual representation of the air cart and the component of the air cart, wherein the notification comprises flashing, color change, or a combination thereof of the visual representation of the component, and wherein the notification does not obstruct display of other operational parameters associated with the air cart via the display.

14. The method of claim 10, wherein providing the notification comprises providing, via the user interface, an audible alarm.

15. The method of claim 10, comprising receiving, via the processor, an acknowledgement signal from the user interface indicative of an acknowledgement of the notification by an operator via an input device of the user interface.

16. The method of claim 10, wherein the component comprises a ladder of the air cart, and wherein providing the notification regarding the position of the component comprises providing, via the user interface, the notification indicating that the ladder of the air cart is in an access position in response to determining the period of time of the absence of ground speed of the air cart.

17. The method of claim 16, comprising:
receiving, via the processor, an additional signal indicative of the position of the ladder from a proximity sensor disposed on the air cart;
determining, via the processor, that the ladder is in the access position based at least in part on the additional signal received from the proximity sensor; and
providing, via the user interface, the notification indicating that the ladder of the air cart is in the access position in response to determining the period of time of the absence of ground speed of the air cart and determining that the ladder is in the access position.

18. A tangible, non-transitory, and computer-readable medium having instructions stored thereon that, when executed by a processor, are configured to cause the processor to:
receive a first signal indicative of a current ground speed of an air cart of an agricultural system from a ground speed sensor disposed on the air cart;
determine an absence of ground speed of the air cart based at least in part on the first signal from the ground speed sensor;
determine a period of time of the absence of ground speed based at least in part on the first signal from the ground speed sensor;
compare the period of time of the absence of ground speed to a threshold period of time; and
output, in response to determining that the period of time of the absence of ground speed exceeds the threshold period of time, a second signal indicative of an instruction to provide a notification regarding a position of a ladder of the air cart via a user interface disposed within a cabin of a work vehicle of the agricultural system, wherein the work vehicle is configured to tow the air cart.

19. The tangible, non-transitory, and computer-readable medium of claim 18, wherein the notification comprises a visual notification via a display of the user interface, an audible alarm, or a combination thereof.

20. The tangible, non-transitory, and computer-readable medium of claim 18, wherein the threshold period of time is at least 1 minute.

* * * * *